(12) United States Patent
Fisher

(10) Patent No.: US 9,303,750 B2
(45) Date of Patent: Apr. 5, 2016

(54) MODULAR CROSS SHAFT YOKE

(75) Inventor: Daniel Philip Fisher, Coldwater, MI (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 14/342,681

(22) PCT Filed: Sep. 6, 2012

(86) PCT No.: PCT/US2012/053823
§ 371 (c)(1),
(2), (4) Date: Mar. 4, 2014

(87) PCT Pub. No.: WO2013/036551
PCT Pub. Date: Mar. 14, 2013

(65) Prior Publication Data
US 2014/0213407 A1    Jul. 31, 2014

Related U.S. Application Data

(60) Provisional application No. 61/531,458, filed on Sep. 6, 2011.

(51) Int. Cl.
*F16H 48/08* (2006.01)
*F16H 48/40* (2012.01)
*F16H 48/42* (2012.01)

(52) U.S. Cl.
CPC ............... *F16H 48/42* (2013.01); *F16H 48/08* (2013.01); *F16H 2048/085* (2013.01); *Y10T 29/49826* (2015.01)

(58) Field of Classification Search
CPC .................................. F16H 48/08; F16H 48/40
See application file for complete search history.

(56) References Cited

U.S. PATENT DOCUMENTS

| 696,704 | A |   | 4/1902 | Allen |
|---|---|---|---|---|
| 1,874,646 | A | * | 8/1932 | Skinner ..................... 184/13.1 |
| 2,529,392 | A | * | 11/1950 | Herreshoff .................. 475/246 |
| 3,323,388 | A | * | 6/1967 | Snoy et al. .................. 475/245 |
| 3,593,595 | A |   | 7/1971 | Taylor |
| 3,651,713 | A | * | 3/1972 | Mueller ...................... 475/230 |
| 3,894,447 | A |   | 7/1975 | Michael |
| 3,974,717 | A |   | 8/1976 | Breed et al. |
| 4,182,201 | A | * | 1/1980 | Mayhew et al. ............. 475/230 |
| 4,867,010 | A |   | 9/1989 | Stettler, Jr. |
| 5,647,814 | A | * | 7/1997 | Krisher ........................ 475/230 |

(Continued)

OTHER PUBLICATIONS

International Search Report and Written Opinion of the International Searching Authority (ISA/220, ISA/210, ISA/237) PCT/US2012/053823, mailed Nov. 5, 2012, pp. 1-11.

(Continued)

*Primary Examiner* — Tisha Lewis
(74) *Attorney, Agent, or Firm* — Mei & Mark LLP

(57) ABSTRACT

A mounting system for a differential, comprising a cross shaft, a first stub shaft, a second stub shaft, and a yoke. The cross shaft comprises a long axis and a passageway through the cross shaft perpendicular to the long axis, the passageway comprising a first hole and a second hole. The first stub shaft comprises a long axis parallel to a central axis of the first hole. The second stub shaft comprises a long axis parallel to a central axis of the second hole. The yoke is in the passageway and comprises a first portion extending in to the first stub shaft and a second portion extending in to the second stub shaft.

24 Claims, 3 Drawing Sheets

(56) References Cited

U.S. PATENT DOCUMENTS

| | | |
|---|---|---|
| 7,025,702 B2 | 4/2006 | Saito et al. |
| 7,081,065 B2 | 7/2006 | Sudou |
| 2002/0183157 A1* | 12/2002 | Ballinger et al. ............. 475/230 |
| 2008/0032847 A1 | 2/2008 | Chludek et al. |

OTHER PUBLICATIONS

International Preliminary Report on Patentability (IB/373, ISA/237) PCT/US2012/053823, mailed Mar. 12, 2014, pp. 1-8.

* cited by examiner

MODULAR CROSS SHAFT YOKE

This is a §371 Application of PCT/US2012/053823, filed Sep. 6, 2012, which claims the benefit of priority to U.S. provisional patent application Ser. No. 61/531,458, filed Sep. 6, 2011, all of which are incorporated herein by reference.

PRIORITY

This application claims the benefit of priority of U.S. provisional patent application 61/531,458, filed Sep. 6, 2011, the content of which is incorporated herein by reference in its entirety.

FIELD

The disclosure relates generally to vehicle differentials having four pinions in a one-piece housing. More specifically, the disclosure relates to a cross shaft and stub shafts with a yoke and self-locking features for use in assembling a differential.

BACKGROUND

Vehicle differentials include gearing to allow the wheels of the vehicle to rotate differently for purposes such as anti-slip, traction control, oversteer, and understeer. One portion of the differential may house pinion gears on one or more shafts. The pinion gears can thereby maintain a location relative to cooperating side gears.

Some differentials may comprise four pinions. Some differentials of this type have required that the housing surrounding four inner pinions be split down the middle in order to mount the pinion shafts. One example having this design overlaps cross shafts with central notches. The machining requirements are high because the housing must mate along a plane, the cross shaft notches must mate, and the housing is typically modified on one or both halves to receive the cross shafts. The design is also bulky and heavy because the housing must have means to lock the halves together.

Other designs for four pinion differentials have a one-piece housing and some combination of stub shafts and cross shaft. The machining requirements are also high for these prior art stub shaft designs because of the use of threaded fasteners in addition to machining for alignment of the stubs and cross shaft. The design may also include retaining plates, thereby increasing the number of toleranced parts. The designs are bulky and heavy because the threaded areas require additional materials for rigidity and the housing requires sufficient means to accept the retaining plates and or threaded members.

SUMMARY

A mounting system for a differential may comprise a cross shaft, a first stub shaft, a second stub shaft, and a yoke. The cross shaft comprises a long axis and a passageway through the cross shaft perpendicular to the long axis, the passageway comprising a first hole and a second hole. The first stub shaft comprises a long axis parallel to a central axis of the first hole. The second stub shaft comprises a long axis parallel to a central axis of the second hole. The yoke is in the passageway and comprises a first portion extending in to the first stub shaft and a second portion extending in to the second stub shaft.

A differential may comprise a one piece housing for substantially enclosing a first, second, third, and fourth pinion gear. A cross shaft may pass through the first and second pinion gears. A first stub shaft may pass through the third pinion gear. A second stub shaft may pass through the fourth pinion gear. A yoke may pass through portions of the cross shaft, the first stub shaft, and the second stub shaft. The yoke may fit to the first stub shaft and the second stub shaft to retain the cross shaft, the first stub shaft, and the second stub shaft within the housing.

A method for assembling pinion shafts in a differential housing may comprise the steps of inserting a cross shaft in to a first opening in the housing and extending the cross shaft through the housing to a second opening in the housing; inserting a yoke in to a first stub shaft; inserting a second stub shaft in to a third opening in the housing; extending the second stub shaft in to abutment with the cross shaft; inserting the first stub shaft in to a fourth opening in the housing; extending the first stub shaft in to abutment with the cross shaft; passing the yoke through cross shaft openings; fitting the yoke to the second stub shaft.

Additional objects and advantages will be set forth in part in the description which follows, and in part will be obvious from the description, or may be learned by practice of the disclosure. The objects and advantages will also be realized and attained by means of the elements and combinations particularly pointed out in the appended claims.

It is to be understood that both the foregoing general description and the following detailed description are exemplary and explanatory only.

DETAILED DESCRIPTION

Reference will now be made in detail to the examples which are illustrated in the accompanying drawings. Wherever possible, the same reference numbers will be used throughout the drawings to refer to the same or like parts.

Figure 1:
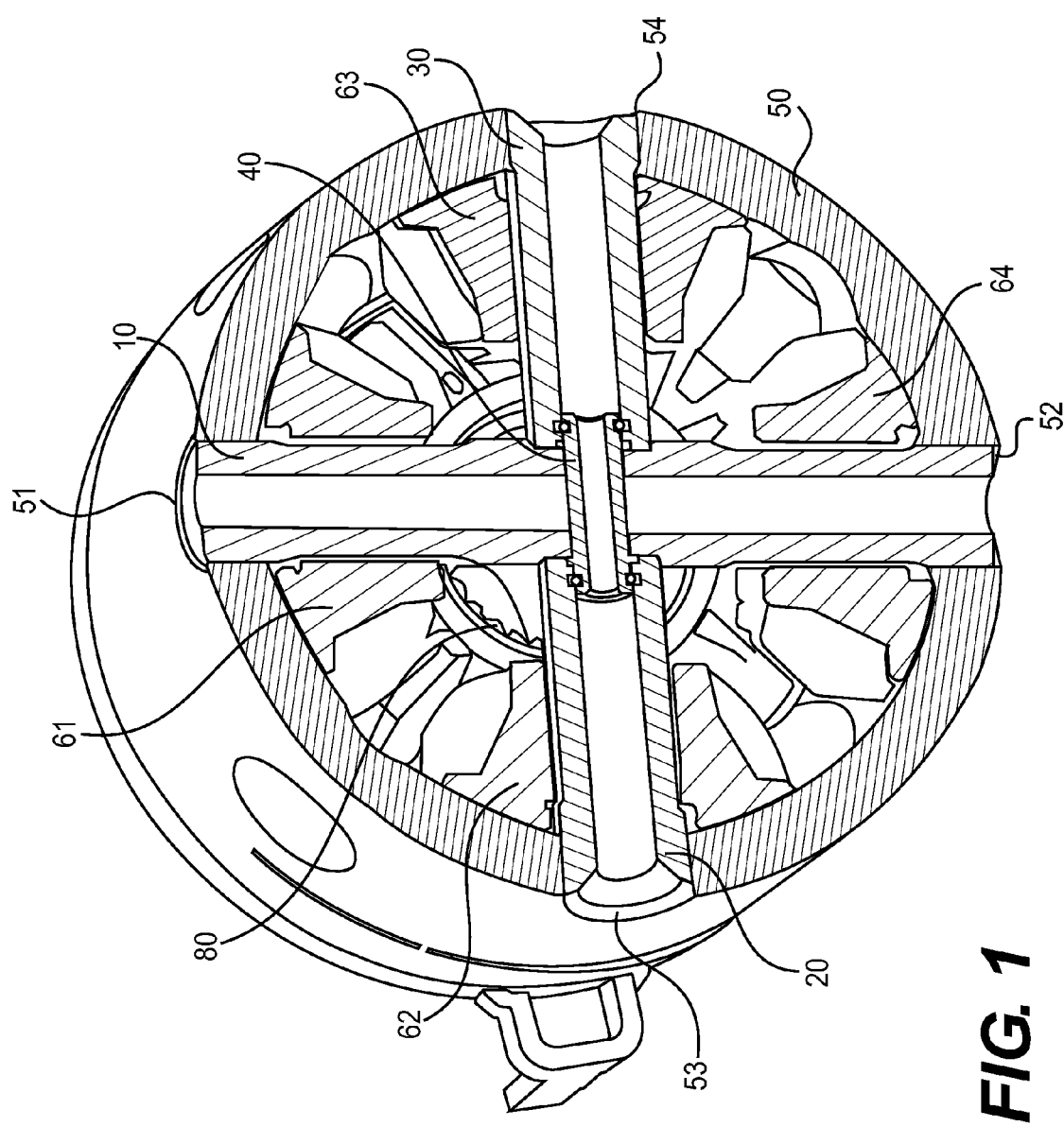
FIG. 1 is cross section of a housing for pinions of a differential.

FIG. 1 shows a cross section of a one-piece pinion housing 50 for a differential. That is, the housing 50 is shown halved, but is in fact a single sleeve that does not require mating with another half to complete the housing. FIG. 1 also shows a side gear 80 cooperating with first, second, third, and fourth pinion gears 61, 62, 63, and 64.

The housing 50 has first, second, third, and fourth housing openings 51, 52, 53, and 54 for accommodating the insertion of a cross shaft 10, first stub shaft 20, and second stub shaft 30. First and second housing openings 51 and 52 are coaxial, and third and fourth housing openings 53 and 54 are coaxial. Cross shaft 10 passes through first and fourth pinions 61 and 64, and the cross shaft 10 is retained, in part, within the first and second housing openings 51 and 52. First stub shaft 20 passes through second pinion 62 and is retained, in part, in third housing opening 53. Second stub 30 shaft passes through third pinion 63 and is retained, in part, in fourth housing opening 54.

A mounting system for the pinions of the differential may comprise yoke 40, cross shaft 10, first stub shaft 20, and second stub shaft 30. Yoke 40 connects to first stub shaft 20, passes through the cross shaft 10, and connects to the second stub shaft 30, which can be seen in more detail in FIGS. 2 and 3.

Yoke 40 may comprise a circumferential lip 41. The lip 41 may press fit in to a recess 21 in the first stub shaft 20 so as to secure the yoke 40 to the first stub shaft 20. An additional fitting may comprise a circumferential groove 22 in the first stub shaft and a circumferential notch 42 in the yoke 40. A snap ring 70, or bang ring, may be placed in the notch 42. Yoke 40, notch 42, and snap ring 70 may be slid in to the first stub shaft 20 until the snap ring 70 mates with the groove 22. The press fit may be used alone or together with the snap ring fitting to secure the yoke 40 with the first stub shaft 20. It may also be desirable to use the snap ring fitting alone without the press fitting.

Figure 2:
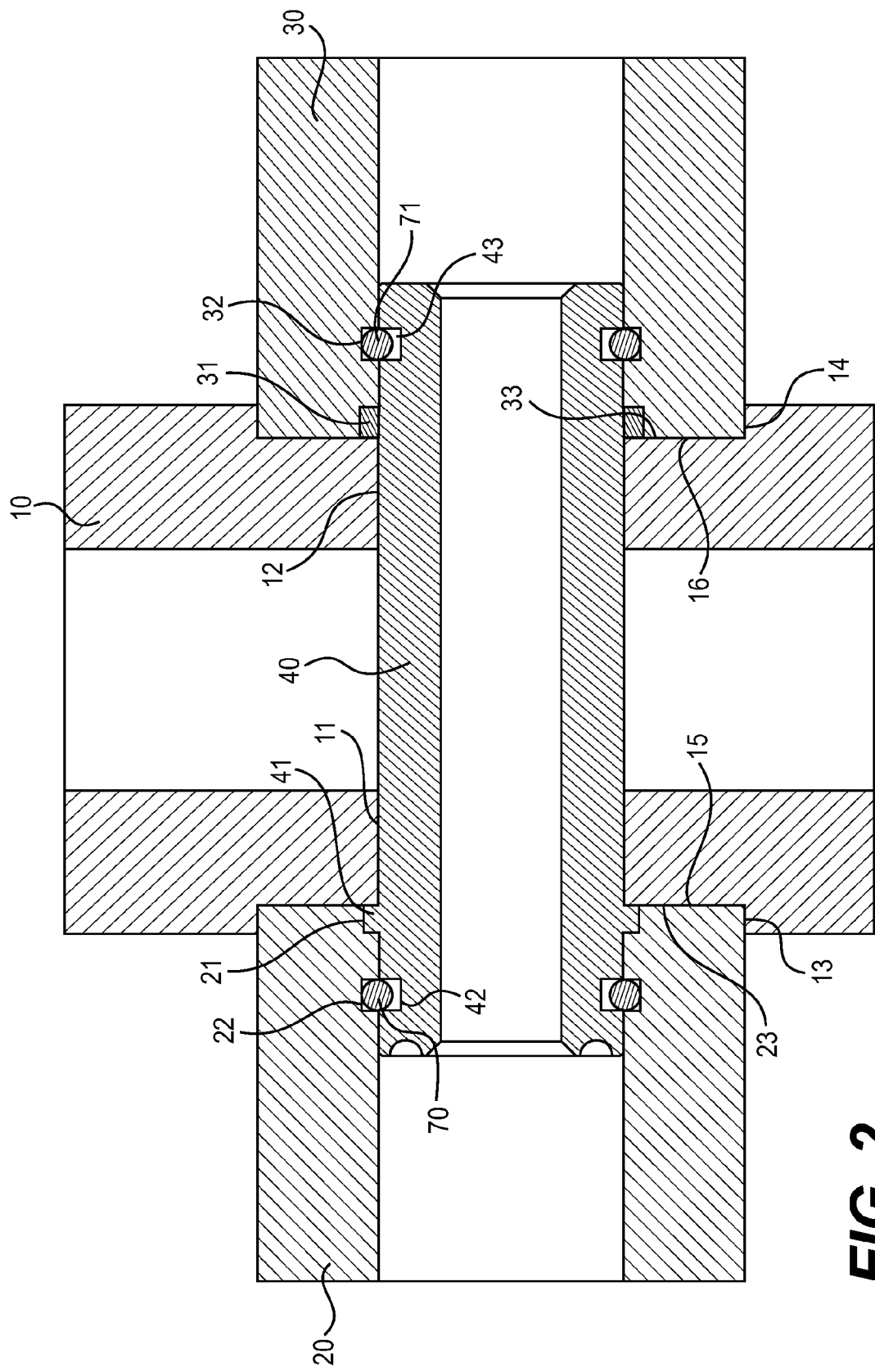
FIG. 2 is a cross section of a portion of the pinion mounting system.

Yoke 40 also comprises a second notch 42 for receiving a second snap ring 71. Yoke 40, second notch 42 and snap ring 71 may be slip fitted in to second stub shaft 30 by sliding in to the second stub shaft 30 until the snap ring 71 seats in second groove 32. FIG. 2 illustrates a second recess 31 in the second stub shaft 30, but the second recess 31 is optional and does not have to mate with a lip on yoke 40. Instead, the first stub shaft 20 may be identical to the second stub shaft so that the same part may be used during assembly.

First stub shaft 20 has a long axis parallel to the long axis of the yoke 40, which is parallel to the long axis of the second stub shaft 30. These three axes are perpendicular to the long axis of the cross shaft 10. Cross shaft 10 has two openings 11 and 12 forming a passageway for a portion of yoke 40 to pass through. Cross shaft 10 also has two recesses 13 and 14 in the outer wall. The recesses 13 and 14 may be proximal with the openings 11 and 12, and may be in concentric proximity with the openings 11 and 12. Each recess has a planar face 15 and 16. A flat end 23 of the first stub shaft 20 may abut planar face 15. A portion of the outer surface of the first stub shaft may abut the interior of the recess 13. Similarly, flat end 33 of the second stub shaft 30 may abut planar face 16. A portion of the outer surface of the second stub shaft may abut the interior of the recess 14. The recesses 13 and 14 may comprise anti-rotation features for complementary features on the stub shafts.

Figure 3:
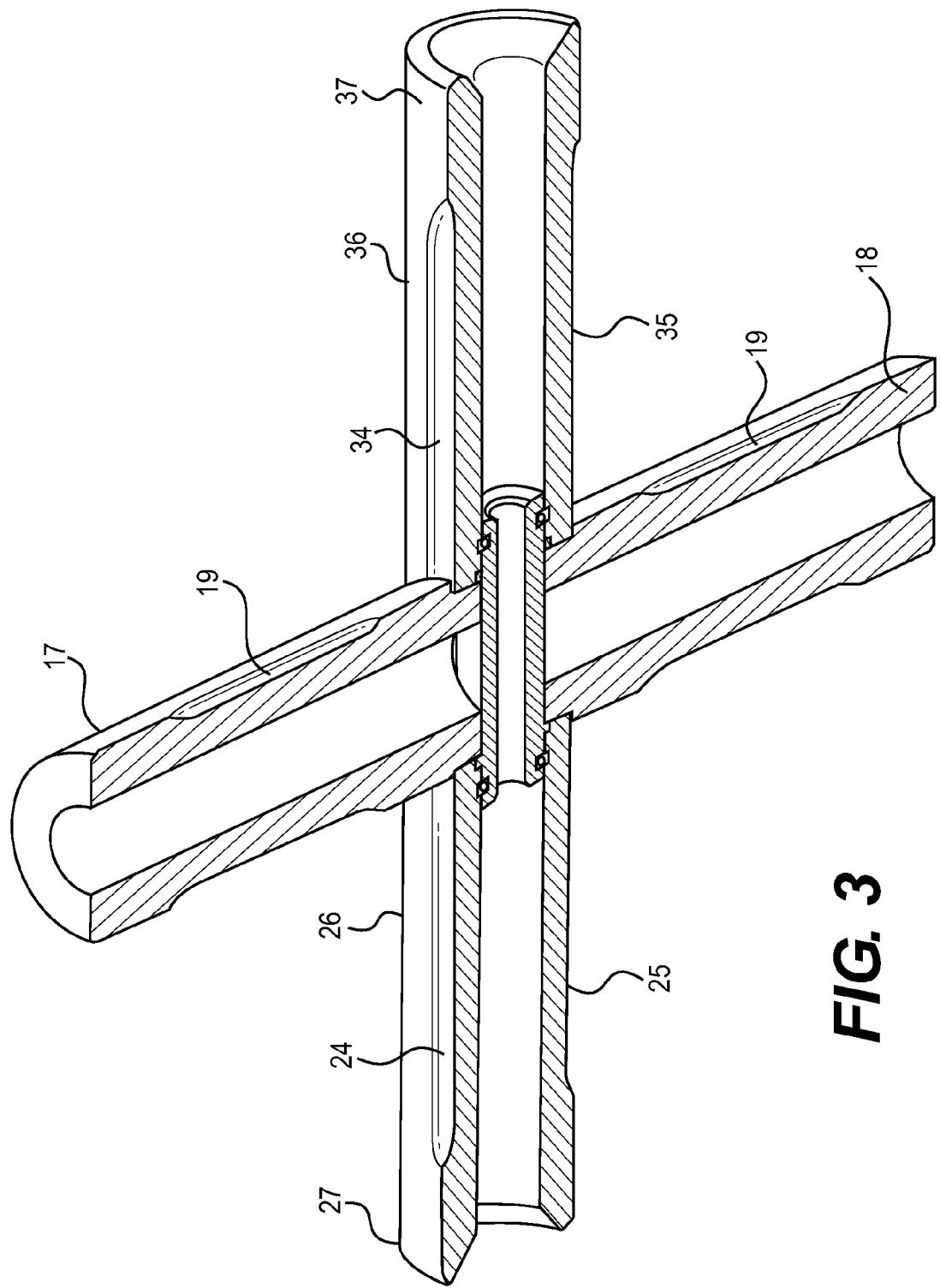
FIG. 3 is a perspective view of the pinion mounting system.

FIG. 3 is a perspective view of the mounting assembly, including anti-rotation features. Anti-rotation features may include at least one inner side wall of the recess 13 being planar, and at least one inner side wall of the recess 14 being planar. FIG. 3 shows two planar side walls of recess 13 abutting two portions of first stub shaft 20 with planar surfaces 24 and 25. Two planar side walls of recess 14 abut two portions of second stub shaft 30 with planar surfaces 34 and 35. The first and second stub shafts 20 and 30 may comprise portions with planar surfaces 24, 25, 34, 35 connected by respective rounded surfaces 26 and 36. The flat surfaces 24, 25, 34, and 35 may lock the stub shafts 20 and 30 from rotating with respect to the cross shaft 10 when the cross shaft 10 includes complementary flat surfaces in the recesses 13 and 14. Other patterns of flat surfaces may be used, such as triangular, square, hexagonal, etc., with our without intervening rounded surfaces.

To maintain balance of weight in the mounting system, the cross shaft 10 has a diameter change or flat surfaces 19. The flat surfaces 24, 25, 34, 35, and 19 reduce the overall weight of the mounting system and reduce the amount of material needed to form the parts.

Respective cylindrical portions 17, 18, 27, and 37 on the cross shaft 10, first stub shaft 20, and third stub shaft 30 fit in to respective first, second, third, and fourth housing openings 51, 52, 53, and 54. The cylindrical portions and openings may be toleranced or tapered for a snug fit once the parts are correctly located.

The edges of the recesses 21 and 31 may be chamfered to allow the snap rings 70 and 71 to slide past the recesses to the grooves 22 and 32. The grooves 22 and 32 and notches 42 and 43 are not chamfered so that the snap rings 70 and 71 cannot recompress to slide out of the assembly. The cross shaft 10 may include additional chamfering at ends of openings 11 and 12 so that the snap ring 71 may be compressed to pass through the cross-shaft 10.

One method of assembling the mounting assembly may comprise press fitting the yoke 40 to the first stub shaft 20, mounting the snap ring 71 to the yoke 40, passing the snap ring 71 on the yoke 40 through the openings 11 and 12 in the cross shaft 10, and sliding the second stub shaft 30 on to the snap ring 71 and yoke 40.

A method for assembling the pinion housing may comprise placing the first, second, third, and fourth pinions 61, 62, 63 and 64 within the housing 50. The cross shaft 10 may be passed through central bores in pinions 61 and 64 and extend in to openings 51 and 52 in the housing. The yoke 40 can press fit via lip 41 to recess 21 of first stub shaft 20. An alternative or additional step may comprise placing snap ring 70 in groove 42 and sliding the snap ring 70 and groove 42 in to first stub shaft 20 until the snap ring 70 snap fits with groove 22. Second snap ring 71 is placed in the notch 43 of yoke 40.

The yoke 40 and first stub shaft 20 may then be inserted in to housing opening 53 so that the stub shaft extends from the housing opening 53 to the cross shaft 10. The flat end 23 of first stub shaft 20 may abut flat surface 15 of recess 13, and the yoke may extend through the openings 11 and 12 in the cross shaft so that the snap ring 71 and notch 43 extends out of the cross shaft 10.

The second stub shaft 30 may be inserted in to housing opening 54 before or after the first stub shaft 20 is inserted. The second stub shaft is inserted to extend from the housing opening 54 to the cross shaft 10 so that flat end 33 abuts flat surface 16. The snap ring 71 and notch 43 form a slip fitting with groove 32.

Yoke 40, cross shaft 10, first stub shaft 20, and second stub shaft 30 are hollow, which greatly reduces the weight of the assembled mounting system. In addition, the fittings in the mounting system eliminate the need for threaded fasteners, which reduces machining tolerances. The use of press and snap fittings simplifies assembly and also reduces machining tolerances. The pinion shafts can be held in place relative to one another without the use of retaining plates, bolts, or other housing-mounted means, which reduces the weight of the assembly and reduces manufacturing complexity. The disclosed mounting system also provides easy assembly within a one-piece pinion housing.

Other implementations will be apparent to those skilled in the art from consideration of the specification and practice of the examples disclosed herein. It is intended that the specification and examples be considered as exemplary only, with the true scope and spirit being indicated by the following claims.

What is claimed is:

1. A mounting system for a differential, comprising:
   a cross shaft comprising:
      a long axis; and
      a passageway through the cross shaft perpendicular to the long axis, the passageway comprising a first hole and a second hole;
   a first stub shaft comprising a long axis parallel to a central axis of the first hole;
   a second stub shaft comprising a long axis parallel to a central axis of the second hole; and
   a yoke in the passageway comprising a first portion extending in to the first stub shaft and a second portion extending in to the second stub shaft, wherein the yoke press fits to the first stub shaft and the yoke slip fits to the second stub shaft.

2. The mounting system of claim 1, further comprising a snap ring, wherein the yoke comprises a first notch and the second stub shaft comprises a groove, and wherein the snap ring secures the first notch with the groove.

3. The mounting system of claim 1, wherein the yoke comprises a notch and the first stub shaft comprises a groove, and wherein a snap ring secures the notch with the groove.

4. The mounting system of claim 1, wherein the yoke comprises a lip and the first stub shaft comprises a recess, and the lip is press fit in the recess.

5. The mounting system of claim 1, wherein the cross shaft, the first stub shaft, and the second stub shaft are hollow.

6. The mounting system of claim 1, wherein the cross shaft comprises a first recess proximal to the first hole and a second recess proximal to the second hole, wherein the first recess comprises a first planar surface and the second recess comprises a second planar surface, wherein the first stub shaft comprises a first planar end and the first planar end abuts the first planar surface, and wherein the second stub shaft comprises a second planar end and the second planar end abuts the second planar surface.

7. The mounting system of claim 6, wherein the first recess comprises at least one planar side wall and an exterior portion of the first stub shaft is planar and is configured to abut the at least one planar side wall of the first recess, and wherein the at least one planar side wall of the first recess prevents rotation of the first stub shaft in the first recess.

8. A differential comprising:
a one piece housing for substantially enclosing:
a first, second, third, and fourth pinion gear;
a cross shaft passing through the first and fourth pinion gears;
a first stub shaft passing through the second pinion gear;
a second stub shaft passing through the third pinion gear; and
a yoke passing through portions of the cross shaft, the first stub shaft, and the second stub shaft,
wherein the yoke press fits to the first stub shaft and the yoke slip fits to the second stub shaft to retain the cross shaft, the first stub shaft, and the second stub shaft within the housing.

9. The differential of claim 8, further comprising a snap ring, wherein the yoke comprises a first notch and the first stub shaft comprises an internal groove, and wherein the snap ring secures the first notch with the groove.

10. The differential of claim 8, further comprising a snap ring, wherein the yoke comprises a notch and the second stub shaft comprises a groove, and wherein the snap ring secures the notch with the groove.

11. The differential of claim 8, wherein the yoke comprises a lip and the first stub shaft comprises a recess, and the lip is press fit in the recess.

12. The differential of claim 8, wherein the cross shaft, the first stub shaft, and the second stub shaft are hollow.

13. The differential of claim 8, wherein the cross shaft comprises a first recess and a second recess, wherein the first recess comprises a first planar surface and the second recess comprises a second planar surface, wherein the first stub shaft comprises a first planar end and the first planar end abuts the first planar surface, and wherein the second stub shaft comprises a second planar end and the second planar end abuts the second planar surface.

14. The differential of claim of claim 13, wherein the first recess comprises at least one planar side wall and an exterior portion of the first stub shaft is planar and is configured to abut the at least one planar side wall of the first recess, and wherein the at least one planar side wall of the first recess prevents rotation of the first stub shaft in the first recess.

15. The differential of claim 8, wherein the housing comprises a first passageway, a second passageway, a third passageway, and a fourth passageway, wherein the first passageway is coaxial with the second passageway and the cross shaft extends from the first passageway to the second passageway, and wherein the third passageway is coaxial with the fourth passageway and the first stub shaft extends from the third passageway to the cross shaft and the second stub shaft extends from the fourth passageway to the cross shaft, wherein the first stub shaft is fitted snugly against the third passageway.

16. The mounting system of claim 7, wherein the second recess comprises at least one planar side wall and an exterior portion of the second stub shaft is planar and is configured to abut the at least one planar side wall of the second recess, and wherein the at least one planar side wall of the second recess prevents rotation of the second stub shaft in the second recess.

17. The differential of claim 8, wherein the first stub shaft abuts the cross shaft, wherein the second stub shaft abuts the cross shaft, wherein the cross shaft further comprises a passageway there through, and wherein the yoke passes through the passageway and extends out of the cross shaft and in to the first stub shaft and in to the second stub shaft.

18. The differential of claim 14, wherein the second recess comprises at least one planar side wall and an exterior portion of the second stub shaft is planar and is configured to abut the at least one planar side wall of the second recess, and wherein the at least one planar side wall of the second recess prevents rotation of the second stub shaft in the second recess.

19. A mounting system for a differential, comprising:
a cross shaft comprising:
a long axis; and
a passageway through the cross shaft perpendicular to the long axis, the passageway comprising a first hole and a second hole;
a first stub shaft comprising a long axis parallel to a central axis of the first hole, the first stub shaft further comprising a recess;
a second stub shaft comprising a long axis parallel to a central axis of the second hole; and
a yoke in the passageway comprising a lip on a first portion, the lip press-fit to the recess of the first stub shaft, the yoke further comprising a second portion extending in to the second stub shaft.

20. The mounting system for a differential of claim 19, wherein the second stub shaft comprises a second recess, and wherein the first stub shaft is identical to the second stub shaft.

21. The mounting system for a differential of claim 19, further comprising at least one snap ring coupled to the yoke.

22. A mounting system for a differential, comprising:
a cross shaft comprising:
a long axis; and
a passageway through the cross shaft perpendicular to the long axis, the passageway comprising a first hole and a second hole;
a first stub shaft comprising a long axis parallel to a central axis of the first hole, the first stub shaft further comprising a recess;
a second stub shaft comprising a long axis parallel to a central axis of the second hole; and
a yoke in the passageway comprising a first portion extending in to the first stub shaft and a second portion extending in to the second stub shaft, wherein the cross shaft comprises a first recess proximal to the first hole,
wherein the first recess comprises a first planar surface,
wherein the first stub shaft comprises a first planar end and the first planar end abuts the first planar surface,
wherein the first recess comprises at least one planar side wall,
wherein an exterior portion of the first stub shaft is planar and is configured to abut the at least one planar side wall of the first recess, and
wherein the at least one planar side wall of the first recess prevents rotation of the first stub shaft in the first recess.

23. The mounting system for a differential of claim 22, further comprising at least one snap ring coupled to the yoke.

24. The mounting system for a differential of claim 22, wherein the first stub shaft further comprises a recess, wherein the yoke further comprises a lip on the first portion, and wherein the lip is press-fit to the recess.

\* \* \* \* \*